United States Patent [19]
Eguchi

[11] Patent Number: 4,885,594
[45] Date of Patent: Dec. 5, 1989

[54] RECORDING APPARATUS WITH POSITION DEPENDENT PULSE MODULATION

[75] Inventor: Tatsuya Eguchi, Osaka, Japan

[73] Assignee: Minolta Camera Kabushiki Kaisha, Osaka, Japan

[21] Appl. No.: 151,811

[22] Filed: Feb. 3, 1988

[30] Foreign Application Priority Data

Feb. 3, 1987 [JP] Japan .................................. 62-23146

[51] Int. Cl.$^4$ ........................ G01D 9/42; G01D 15/14
[52] U.S. Cl. ...................................... 346/108; 346/60
[58] Field of Search ................................ 346/108, 160

[56] References Cited

U.S. PATENT DOCUMENTS 4,037,231 7/1977 Broyles et al. ...................... 346/108
4,717,925 1/1988 Shibata et al. ...................... 346/108
4,768,043 8/1988 Saito et al. ........................... 346/108

FOREIGN PATENT DOCUMENTS 33777 6/1985 Japan .

Primary Examiner—George H. Miller, Jr.
Attorney, Agent, or Firm—Price, Gess & Ubell

[57] ABSTRACT

In a recording apparatus, a laser beam with the pulse modulated corresponding to image data scans an objective plane by a deflection device. On that occasion, a plurality of select signals are generated corresponding to the position of the laser beam on the scanning line based on the start signal indicating the start of scanning by the laser beam. The generated reference pulse is frequency-divided to form a plurality of pulse signals having a different width. One of the pulse signals is selected by the select signal and the image data is processed based on the selected pulse signal. The select signal is set to make a wide pulse signal correspond to the central portion of the scanning line and a narrow pulse signal correspond to both end portions of the scanning line.

20 Claims, 5 Drawing Sheets

RECORDING APPARATUS WITH POSITION DEPENDENT PULSE MODULATION

BACKGROUND OF THE INVENTION

1. Field of the Invention

The present invention relates to a recording apparatus such as a laser printer adapted to record an image by scanning a photoreceptor with a pulse modulated laser beam. More specifically, the present invention relates to a recording apparatus capable of correcting image distortion due to the difference in the incident angle and the moving speed of the laser beam between the central portion and the peripheral portion of the photoreceptor.

2. Description of the Prior Art

In a laser printer, a latent image of pixels is formed on a photoreceptor cylinder by a laser beam deflected by a polygon mirror rotating at high speed and, a visible image obtained by toner developing is transferred to a paper and then fixed thereon. The laser printer enables high speed and high quality (high resolution) printing and graphic recording, since high speed modulation of the laser beam is possible.

Figure 1:
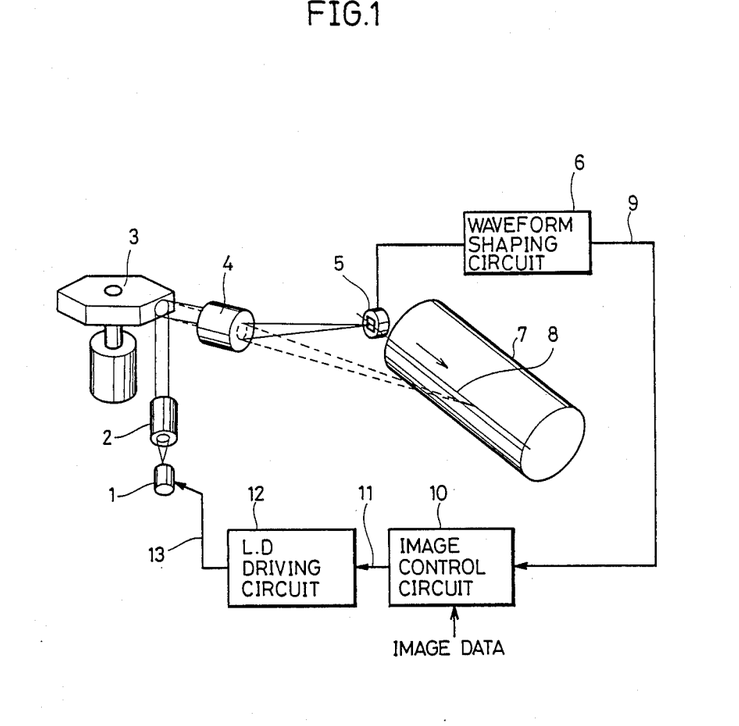
FIG. 1 is a schematic diagram showing one embodiment of a laser printer employing the present invention.
Figure 4A:
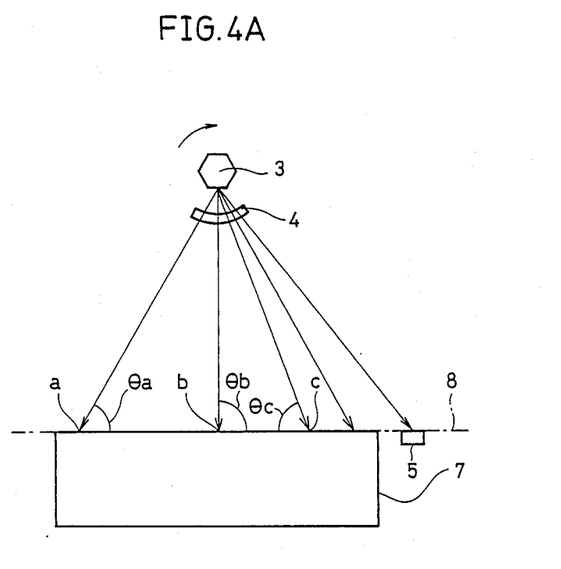
FIG. 4A is a schematic plan view illustrating the incident angle of the laser beam.
Figure 4B:
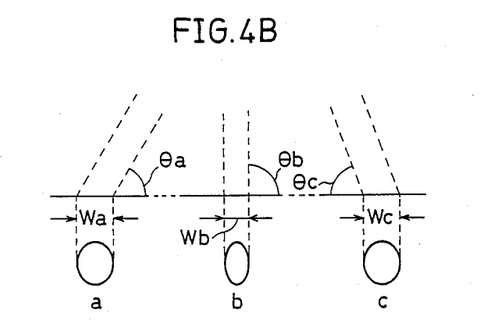
FIG. 4B shows examples of the projected light image of the laser beam at each of the points a, b and c of FIG. 4A.
Figure 6:
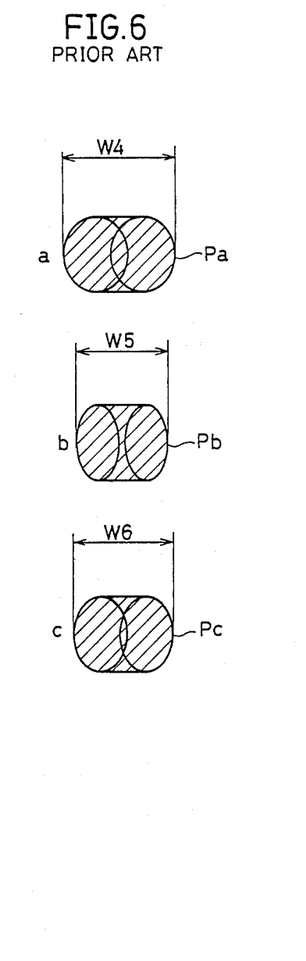
FIG. 6 corresponds to FIG. 5 showing uncorrected images by a conventional laser printer.

Generally, the laser printer has such structure as shown in FIG. 1, which is also employed in the embodiment of the present invention described in the following. The laser beam is emitted from a laser diode 1, deflected by a polygon mirror 3 and scans a photoreceptor 7. The incident angle of the laser beams changes depending on the position on the beam scanning line 8. In FIG. 4A, which is a schematic plan view illustrating the difference in the incident angles, while the incident angle $\theta b$ is a right angle at the point b in the central portion on the beam scanning line 8, the incident angles $\theta a$ and $\theta c$ are acute angles at the points a and c, respectively, near both ends of the beam scanning line 8. Consequently, the projected light images of the laser beam at the points a, b and c have their respective beam diameters Wa, Wb and Wc along the main scanning direction different from each other. More specifically, the beam diameters Wa and Wc near both ends are larger than the beam diameter Wb at the central portion. Therefore, assuming that the angular velocity of the laser beam is constant and the scanning is carried out for the same period of time with the laser beam turned on, then the images formed on the photoreceptor 7 will have beam widths of W4>W6>W5 as shown in FIG. 6, namely, the widths in the scanning direction of the images Pa, Pc and Pb at the points a, b and c are wider in this order. Therefore, an image distortion occurs, i.e. lines and dots become thicker and larger and the density thereof becomes higher in the end portions of the photoreceptor 7 compared with the central portion of the same.

The scanning speed of the laser beam on the beam scanning line 8 is faster at both ends than at the central portion, thereby increasing the above mentioned image distortion. However, the image distortion due to the difference in the scanning speed is generally corrected by employing a lens system including f$\theta$ lens 4 (hereinafter simply referred to as f$\theta$ lens 4). Meanwhile, a method for ensuring constant speed scanning electrically without using the f$\theta$ lens is proposed in Japanese Patent Laying-Open Gazette No. 33777/1985. In this method, the frequency of the switching clock of the laser beam is controlled so as to increase the speed of the clock near both ends of the plane being scanned and decrease the speed of the clock at the central portion. However, the difference in the incident angles can not be corrected in this method.

SUMMARY OF THE INVENTION

In view of the foregoing, an object of the present invention is to enhance the quality of the image by correcting the image distortion due to the difference in the incident angles of the laser beam to the photoreceptor as much as possible.

One aspect of the present invention is a recording apparatus in which a laser beam with the pulse modulated corresponding to the image data scans an objective plane by means of a deflection device, comprising position signal output means for outputting a position signal corresponding to the position of the laser beam on the scanning line and duty cycle changing means for changing in response to the position signal the duty cycle for the pulse modulation which responds to the image data, so that an on or off time period for one cycle of the pulse modulation becomes smaller at both ends of the scanning line than at the central portion. Preferably, the image data is outputted in response to a predetermined fixed period.

The other aspect of the present invention is a recording apparatus in which a laser of the pulse modulated type corresponding to image data scans an objective plane by a deflection device, comprising a start signal output means for outputting a start signal indicating the start of the laser beam scanning, select signal output means for outputting a plurality of select signals corresponding to the positions of the laser beams on the scanning line based on the start signal, reference pulse generating means for generating a reference pulse, pulse signal forming means for forming a plurality of pulse signals having a different width by frequency-dividing the reference pulse, and modulating means for selecting one of the plurality of pulse signals by the select signal for modulating the image data by the selected pulse signal, wherein the select signal is set to make a wide pulse signal correspond to the central portion of the scanning line and a narrow pulse signal correspond to both ends of the scanning line. Preferably, the pulse signal forming means forms each of the pulse signals in such a manner that the center of the width of each of the pulse signals coincides with each other in each of the periods defined by a prescribed number of the reference pulses.

The other aspect of the present invention is a recording apparatus comprising image control means to which an image data is inputted and from which a laser beam signal corresponding to the image data is outputted, laser beam control means to which the laser beam signal is inputted and from which a laser beam as a pulse is outputted through a deflection device in response to the laser beam signal, and image recording means having a plane which is scanned by the laser beam from the laser beam control means, with the image control means having laser beam signal output means for outputting a laser beam signal such that the beam diameter of the laser beam outputted from the laser beam control means is made smaller when the scanning position of the laser beam on the plane is in the central portion of the scanning region than it is in the end portion of the scanning region. Preferably, the image control means comprises reference pulse generating means for generating a reference pulse, pulse signal forming means for forming a plurality of pulse signals having a different width by frequency-dividing the reference pulse, and modulating means for selecting one of the plurality of pulse signals for modulating the image data by the selected pulse signal, with the laser beam signal output means having means for outputting said laser beam signal such that a wide pulse signal corresponds to the central portion of said scanning region and a narrow pulse signal corresponds to the end portion of the scanning region. Preferably, the pulse signal forming means comprises means for outputting a plurality of pulse signals having the same frequency and different duty cycles. Preferably, the pulse signal forming means comprises means for forming each of the pulse signals such that the center of the width of each of the pulse signals coincide with each other in each period defined by a prescribed number of the reference pulses. Preferably, the image control means has position signal output means for outputting a position signal corresponding to the position of the laser beam on the scanning region, and the laser beam signal output means comprises means for outputting the laser beam signal such that the beam diameter is changed by changing the duty cycle of the laser beam in response to the position signal. Preferably, the recording apparatus further comprises start signal output means for outputting a start signal indicating the start of the laser beam scanning, the image control means has select signal output means for outputting a plurality of select signals corresponding to the position of the laser beam on the scanning region based on the start signal, and the laser beam signal output means comprises means for outputting the laser beam signal based on the select signal. Preferably, the image control means has a counter which starts counting in synchronization with the start signal, and the laser beam signal output means comprises means for detecting the position of the laser beam on the scanning region by the count value of this counter. Preferably, the select signal output means comprises means for outputting a select signal which corresponds to each of the central portion, intermediate portions between the central portion and each of the end portions, and both end portions according to the count value of the counter. Preferably, the select signal output means comprises means for outputting three type select signals dependent on which position of the central portion, intermediate portion between the central portion and the end portion and both end portions of the scanning region the laser beam exists, so that the beam diameter is changed by three steps. Preferably, the image data is outputted in response to a predetermined fixed period.

These objects and other objects, features, aspects and advantages of the present invention will become more apparent from the following detailed description of the present invention when taken in conjunction with the accompanying drawings.

DESCRIPTION OF THE PREFERRED EMBODIMENTS

In FIG. 1, a laser diode 1 (hereinafter referred to as LD) is modulation-driven by an LD driving circuit 12 which will be described in the following. A collimator lens 2 is located at a position for receiving a laser beam from the LD1 to correct the expansion of the beam diameter. A polygon mirror 3 is located at a position receiving the laser beam from the collimator lens 2. The polygon mirror 3 so rotates that the laser beam scans the photoreceptor 7 to obtain the beam scanning line 8. A $f\theta$ lens 4 is located at a position receiving the laser beam from the polygon mirror 3 to correct the image distortion by allowing the laser beam to scan the photoreceptor 7 at a constant speed. A beam detector 5 is provided adjacent to the photoreceptor 7 to decide the character printing position in the main scanning direction. The photoreceptor 7 is a cylindrical member located at a position receiving the laser beam from the $f\theta$ lens 4. The beam scanning line 8, which is indicated for convenience, first passes through the beam detector 5 and then passes through the photoreceptor 7 for scanning.

The LD driving circuit 12 outputs a LD driving signal 13 which is formed of a pulse train corresponding to the image data. The LD1 is switched by the LD driving signal 13 to emit a pulse-modulated laser beam. A waveform shaping circuit 6 receives a signal which is outputted when the laser beam passes through the beam detector 5, shapes the waveform of the signal and outputs a SSCAN signal 9. An image control circuit 10 receives the SSCAN signal 9 and outputs, in synchronization with the signal, an image data for every line of the beam scanning line 8 as an LD data signal 11 to the aforementioned LD driving circuit 12.

Figure 2:
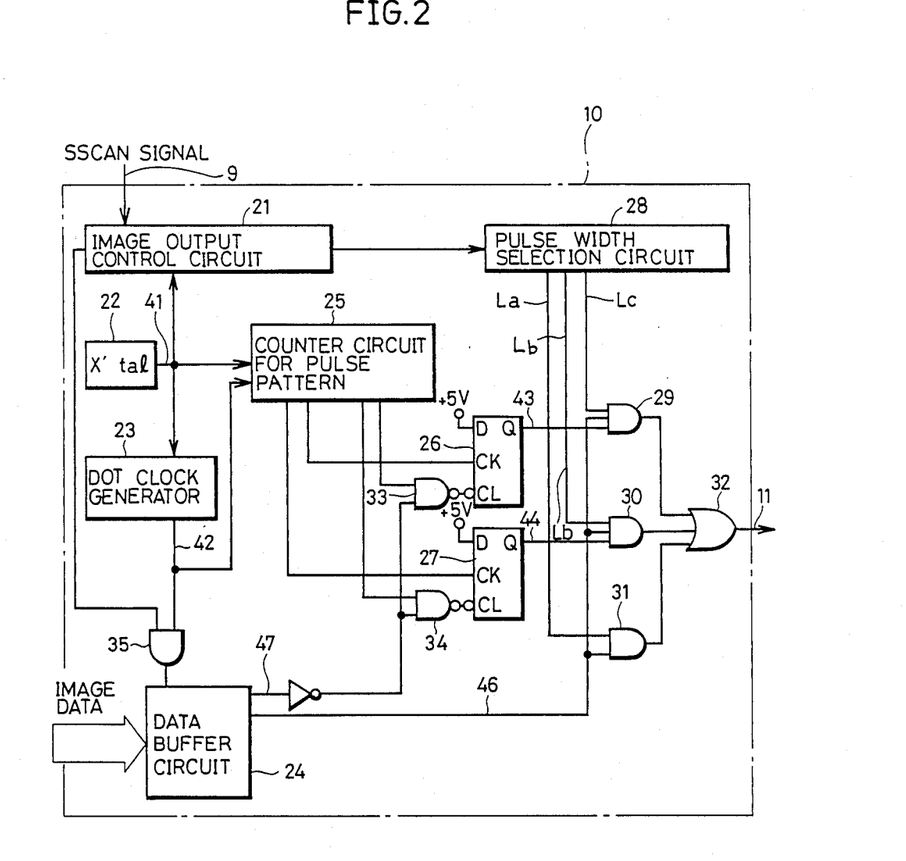
FIG. 2 is a block diagram of the image control circuit of FIG. 1.

FIG. 2 is a block diagram of the image control circuit 10.

The image data supplied from a character generator and the like, not shown, is loaded in a data buffer circuit 24. Meanwhile, an oscillator 22 employing a crystal oscillator outputs a source oscillation clock signal 41. A dot clock generator 23 receives the source oscillation clock signal 41 and carries out frequency division processing, thereby outputting a dot clock signal 42. In response to the dot clock signal 42, the image data is outputted as the LD data signal 11 from the image control circuit 10. The image output control circuit 21 has a counter which starts counting in synchronization with the SSCAN signal 9. By the count value of this counter, the position of the laser beam on the beam scanning line 8, i.e., the position in the main scanning direction on the photoreceptor 7 is detected, and the start position for writing the image and the width of the image area are determined. A signal based on this determination regulates the dot clock signal 42 to the data buffer circuit 24 through the AND gate 35 so that no image data is outputted out of the width of the recording paper.

A counter circuit 25 for pulse pattern counts the source oscillation clock signal 41 of the oscillator 22 and outputs a signal for determining the output timing and clear timing of D flip flops 26 and 27. D flip flops 26 and 27 output pulse signals 43 and 44 which have the same frequency and different duty cycles.

Gates 33 and 34 control pulses for clearing the D flip flops 26 and 27. More specifically, the gates 33 and 34 operate in such a manner that if the dot next to the dot being presently printed is off (does not exist), a clear pulse from the counter circuit 25 for pulse pattern is inputted to D flip flops 26 and 27, and if the dot next to the dot being presently printed is on (exists), the clear pulse is not inputted to the D flip flops 26 and 27. Such control of the clear pulse is carried out by a clear pulse control signal 47 which is outputted from a data buffer circuit 24 which detects the state of the dot next to the one which is being printed. Therefore, when the data signals 46 are on for more than 2 dots, the LD data signals 11 are controlled to be continuously on, whereby an erroneous entrance of an off signal between dots which are a train of on signals is prevented.

As described above, a counter in the image output control circuit 21 detects the position of the laser beam on the photoreceptor 7. A pulse width selection circuit 28 outputs one of the select signals La, Lb and Lc which correspond to the central portion, intermediate portions between the central portion and each of the end portion and both end portions, respectively, in response to the count value of the counter.

Figure 3A:
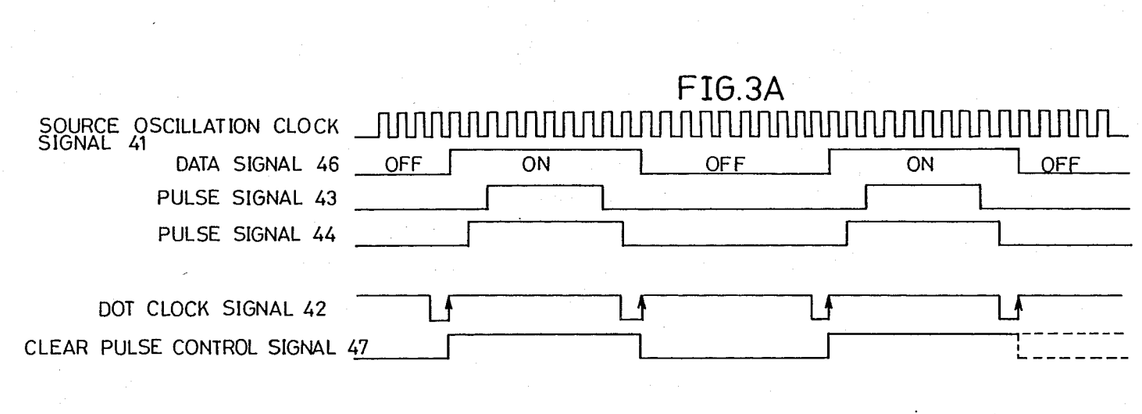
FIGS. 3A and 3B are time charts showing signal waveforms of each portion of the image control circuit of FIG. 2.
Figure 3B:
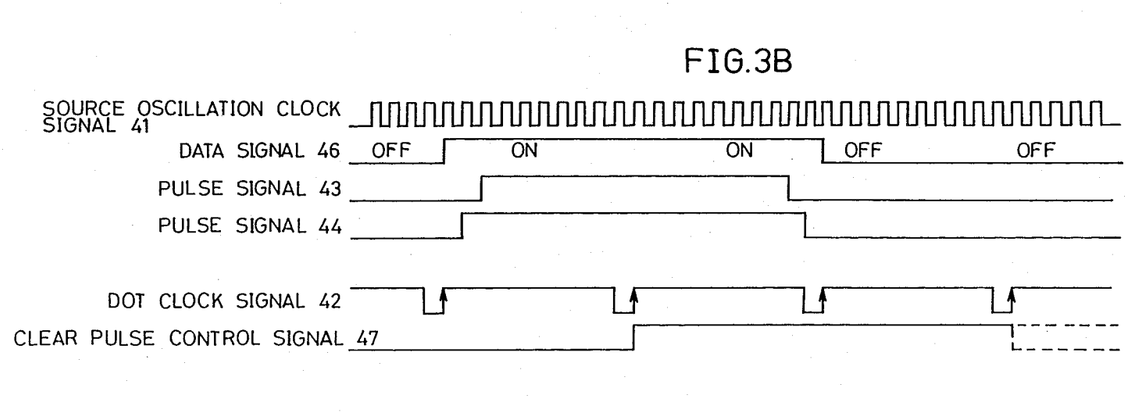

FIGS. 3A and 3B are time charts showing a signal waveform of each of the portions in the above described image control circuit 10. In FIG. 3A, on or off of the data signal 46 is alternately repeated, such as off-on-off-on-off. In FIG. 3B, on or off of the data signal 46 continues for 2 dots, respectively, for example, off-on-on-off-off.

The dot clock signal 42 is obtained by frequency-dividing the source oscillation clock signal 41 by 10 with the duty cycle of 90% of the same, whose rise is used to obtain the output timing of the data signal 46 from the data buffer circuit 24. The dot clock signal 42 is also used as a clear signal of the counter circuit 25 for pulse pattern. The on periods of the pulse signals 43 and 44 are 6 clocks and 8 clocks, respectively, of the source oscillation clock signal 41. The duty cycles of the pulse signals 43 and 44 are 60% and 80%, respectively, of the source oscillation clock signal 41.

The data signal 46, and pulse signals 43 and 44 are set such that the center of the pulse width coincides with each other, thereby maintaining the relation of the position of the image uniform at the central portion and end portions of the photoreceptor 7. In order to attain the above described state, the counter circuit 25 for pulse pattern first receives the dot clock signal 42 and generates signals to the clock terminals of the D flip flops 26 and 27, respectively, with a delay of 2 pulses of the source oscillation clock signal 41 to the D flip flop 26 and a delay of 1 pulse to the D flip flop 27. These signals turn on the pulse signals 43 and 44, respectively. Turning off of the pulse signals 43 and 44 is also controlled by the signal outputted from the counter circuit 25 for pulse pattern to the AND circuits 33 and 34.

Dependent on the position of the laser beam on the photoreceptor 7, namely, whether it is in the central portion, in the intermediate portion between the central portion and the end portion, or in the end portions, one of the select signals La, Lb and Lc is outputted from the pulse width select circuit 28, whereby one of the and gates 29, 30 and 31 is selected. Therefore, the data signal 46 itself, a logical product of the data signal 46 and the pulse signal 44 or a logical product of the data signal 46 and the pulse signal 43 is selected as a signal inputted to the OR gate 32. In response to the selection, the LD data signal 11 is outputted from the or gate 32. Therefore, the duty cycle of the LD data signal 11 is changed so as to reduce the on width at both ends of the photoreceptor 7 than at the central portion of the same. As is apparent from FIG. 3B, when the on state of the data signal 46 continues, the clear pulse control signal 47 is turned off so that the D flip flops 26 and 27 are not cleared and the pulse signals 43 and 44 become continuous.

Figure 5:
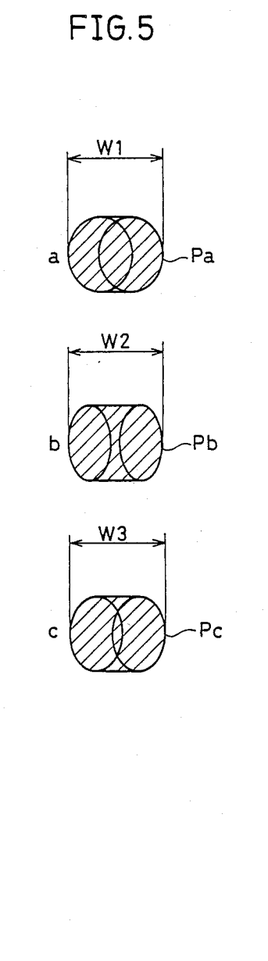
FIG. 5 shows corrected image at each of the points a, b and c of FIG. 4A.

In the laser printer in accordance with the above described embodiment, the on width of the laser beam becomes smaller at both end portions of the photoreceptor 7 than at the central portion, so that the on period of the laser beam becomes smaller as well, whereby the image distortion can be corrected which is derived from the difference of the beam diameters Wa, Wb and Wc of the projected light image of the laser beam. For example, assuming that the select signals Lc, La and Lb of FIG. 2 are respectively selected at each of the points a, b and c of FIG. 4A, the image Pb is the same as that in FIG. 6; however, the images Pa and Pc are reduced in width in the scanning direction by a certain proportion, and the beam diameters become $W_1 \approx W_2 \approx W_3$ so that the images Pa, Pb and Pc at each of the positions have almost the same size, as shown in FIG. 5. In addition, since the center of the on width of each of the pulse signals 43 and 44 and the data signal 46 coincides with each other, the positions of the dots of the image have the same intervals, thereby preventing the image distortion due to the diversification of the dot positions.

In the above embodiment, the ratio of the frequency-division of the data signal 46, and the duty cycles of the pulse signals 43 and 44 may be appropriately determined in view of the structure of the optical system in the laser printer. Although the position of the laser beam on the photoreceptor 7 is divided into three and correction is carried out by generating two pulse signals 43 and 44 in the above described embodiment, it may be made continuously. Various changes and modifications may be made on the structure of the image controller circuit 10 and the devices used therein. A hologram disc may be used as a deflection device. The present invention can be applied to a recording apparatus other than the laser printer.

Although the present invention is applied to the reverse developing type device, in which the portion of the photoreceptor which is illuminated by the laser beam is developed to form an image in the above described embodiment, the present invention may be applied to the type in which the portion of the photoreceptor which is not illuminated by the beam is developed. In that case, the off period is made smaller at both end portions of the photoreceptor in modulating the laser beam.

According to the present invention, the image distortion due to the difference in the incident angles of the laser beam to the photoreceptor can be corrected as much as possible, enabling the enhancement of the image quality.

Although the present invention has been described and illustrate in detail, it is clearly understood that the same is by way of illustration and example only and is not to be taken by way of limitation, the spirit and scope of the present invention being limited only by the terms of the appended claims.

What is claimed is:

1. A recording apparatus in which a laser beam with its pulse modulated corresponding to image data scans an objective plane by a deflection device, comprising:
   means for providing a constant speed scanning of the laser beam on a recording surface;
   position signal output means for outputting a position signal corresponding to the position of said laser beam on a scanning line of said recording surface, and
   duty cycle changing means for changing in response to said position signal the duty cycle of the pulse modulation which responds to the image data, so that an on or off period width of the pulse modulation during each cycle becomes smaller at an end portion of said scanning line than at the central portion of the scanning line whereby uniform width image dots are formed across the entire scanning line of said recording surface.

2. A recording apparatus according to claim 1, wherein said image data is outputted in response to a predetermined fixed period.

3. A recording apparatus comprising:
   image control means to which an image data is inputted and from which a laser beam signal corresponding to the image data is outputted,
   laser beam generating means to which said laser beam signal is inputted and from which a laser beam as a pulse is outputted through a deflection device in response to said laser beam signal,
   image recording means having a plane to be scanned by said laser beam from said laser beam generating means, wherein
   said image control means further comprises laser beam signal output means for outputting said laser beam signal to said laser beam generating means in such a manner that an image dot diameter to be formed on said image recording means is made equal when the scanning position of said laser beam on said plane is in the central portion of the scanning plane and when it is at an end portion of the scanning plane.

4. A recording apparatus according to claim 3, wherein
   said image control means further comprises reference pulse generation means for generating a reference pulse,
   pulse signal forming means for forming a plurality of pulse signals having different widths by frequency-dividing said reference pulse, and
   modulating means for selecting one of said plurality of pulse signals for modulating the image data by the selected pulse signal, and wherein
   said laser beam signal output means further comprises means for outputting said laser beam signal in such a manner that a wide pulse signal corresponds to the central portion of said scanning plane and a narrow pulse signal corresponds to the end portion of said scanning plane.

5. A recording apparatus according to claim 4, wherein said pulse signal forming means comprises means for outputting a plurality of pulse signals having the same frequency and different duty cycles.

6. A recording apparatus according to claim 5, wherein said pulse signal forming means comprises means for forming each pulse signal in such a manner that the center of the width of each pulse signal coincides with each other pulse signal in each period which is defined by a prescribed number of the reference pulses.

7. A recording apparatus according to claim 6, wherein said laser beam signal output means comprises means for outputting said laser beam signal in such a manner that the image dot diameter is changed by changing the duty cycle of said laser beam.

8. A recording apparatus according to claim 7, which further comprises start signal output means for outputting a start signal indicating the start of said laser beam scanning, wherein
   said image control means has select signal output means for outputting a plurality of select signals corresponding to the positions of said laser beam on the scanning plane based on said start signal, and
   said laser beam signal output means comprises means for outputting said laser beam signal in response to said select signal.

9. A recording apparatus according to claim 8, wherein said image control means comprises a counter which starts in synchronization with said start signal, and
   said laser beam signal output means comprises means for detecting the position of said laser beam on said scanning plane by the count value of said counter.

10. A recording apparatus according to claim 9, wherein said select signal output means comprises means for outputting a select signal corresponding to each of the central portion, the intermediate portions between the central portion and each of the end portions, and the end portions of said scanning plane by the count value of said counter.

11. A recording apparatus according to claim 10, wherein said select signal output means comprises means for outputting three kinds of said select signals dependent on which portion of said scanning plane said beam is in.

12. A recording apparatus according to claim 11, wherein said image data is outputted in response to a predetermined fixed period.

13. A recording apparatus in which a laser beam is pulse modulated to correspond to image data for scanning an objective plane by a deflection device with laser beam pulses, comprising:
   start signal output means for outputting a start signal indicating the start of said laser beam scanning;
   select signal output means for outputting a plurality of select signals corresponding to the position of said laser beam on the scanning line based on said start signal;
   reference pulse generation means for generating a reference pulse;
   pulse signal forming means for forming a plurality of pulse signals having different widths by dividing said reference pulse, each of the pulse signals formed so that the center of the width of each pulse signal coincides with each other pulse signal in each period defined by a predetermined number of the reference pulses, and
   modulating means for selecting one of said plurality of pulse signals in response to one of said select signals for modulating an image data by the selected pulse signal, wherein said select signals are set to make at least one of a wide pulse signal correspond to the central portion of said scanning line and a narrow pulse signal correspond to both end portions of the scanning line.

14. A recording apparatus using pulses of a laser beam representative of image data for recording information, comprising:
 image control means, in which image data is inputted and from which a laser beam control signal corresponding to the image data is outputted, including reference pulse generation means for generating a reference pulse, pulse signal forming means for forming a plurality of pulse signals having different widths by frequency-dividing said reference pulse and for outputting a plurality of pulse signals having the same frequency and different duty cycles, each pulse signal being formed so that the center of the width of each pulse signal coincides with each other pulse signal in each period that is defined by a prescribed number of the reference pulses, and modulating means for selecting one of said plurality of pulse signals for modulating the image data by the selected pulse signal;
 laser beam generating means to which said laser control beam signal is inputted and from which a laser beam in the form of pulses is outputted in response to said laser beam control signal, and
 image recording means having a plane to be scanned by said laser beam from said laser beam generating means, wherein said image control means outputs said laser beam control signal in such a manner that an image dot diameter to be formed on said image recording means is made equal when the scanning position of said laser beam on said plane is at the central portion of the scanning region and at the end portion of the scanning region.

15. A recording apparatus according to claim 14, wherein said image control means comprises means for outputting said laser beam control signal in such a manner that the image dot diameter is changed by changing the duty cycle of said laser beam.

16. A recording apparatus according to claim 15, which further comprises start signal output means for outputting a start signal indicating the start of said laser beam scanning, wherein
 said image control means further has a select signal output means for outputting a plurality of select signals corresponding to the positions of said laser beam on the scanning region based on said start signal, and
 said image control means comprises means for outputting said laser beam control signal in response to said select signal.

17. A recording apparatus according to claim 15, wherein said image control means further includes a counter which starts in synchronization with said start signal, and said image control means comprises means for detecting the position of said laser beam on a scanning region of the plane of the image recording means by the count value of said counter.

18. A recording apparatus according to claim 17, wherein said select signal output means comprises means for outputting a select signal corresponding to each of a central portion, intermediate portions between the central portion and each end portion, and the end portions of said scanning region by the count value of said counter.

19. A recording apparatus according to claim 18, wherein said select signal output means comprises means for outputting three kinds of said select signals dependent on which scanning portion said laser beam is in, including a central portion signal, an intermediate portion signal between the central portion and an end portion, and an end portion signal.

20. A recording apparatus according to claim 19, wherein said image data is outputted in response to a predetermined fixed period.

* * * * *